(12) United States Patent
Elberbaum

(10) Patent No.: US 6,191,814 B1
(45) Date of Patent: Feb. 20, 2001

(54) APPARATUS FOR POWERING TELEVISION CAMERAS VIA CAMERA TRANSMISSION LINES

(75) Inventor: David Elberbaum, Tokyo (JP)

(73) Assignee: Elbex Video Ltd., Tokyo (JP)

( * ) Notice: Under 35 U.S.C. 154(b), the term of this patent shall be extended for 0 days.

(21) Appl. No.: 08/803,616

(22) Filed: Feb. 21, 1997

(51) Int. Cl.[7] .............................. H04N 7/14; H04N 5/232
(52) U.S. Cl. ........................... 348/212; 348/372; 348/17
(58) Field of Search ..................... 348/12, 13, 14–17, 348/212, 213, 214, 143, 152, 153, 159; 600/109, 110, 160, 178, 323, 340, 372

(56) References Cited

U.S. PATENT DOCUMENTS

| | | | |
|---|---|---|---|
| 4,183,044 | * | 1/1980 | Breithaupt ............................ 348/211 |
| 4,369,467 | * | 1/1983 | Smith ................................... 348/212 |
| 4,511,886 | * | 4/1985 | Rodriguez ............................ 348/143 |
| 4,782,393 | * | 11/1988 | Kawamura ........................... 348/212 |
| 4,943,864 | * | 7/1990 | Elberbaum ........................... 348/159 |
| 4,989,085 | * | 1/1991 | Elberbaum ........................... 348/159 |
| 5,003,457 | * | 3/1991 | Ikei et al. ........................ 340/310.06 |
| 5,142,277 | * | 8/1992 | Yarberry et al. ................ 340/310.06 |
| 5,298,933 | * | 3/1994 | Chigira ................................... 396/82 |
| 5,335,014 | * | 8/1994 | Elberbaum ........................... 348/159 |
| 5,389,968 | * | 2/1995 | Koyanagi et al. ................... 348/222 |
| 5,432,597 | * | 7/1995 | Parker et al. ........................ 356/139 |
| 5,579,060 | * | 11/1996 | Elberbaum ........................... 348/705 |
| 5,717,460 | * | 2/1998 | Tsuruta et al. ...................... 348/371 |
| 5,784,105 | * | 7/1998 | Kawamura ........................... 348/372 |
| 6,018,236 | * | 1/2000 | Keeth ................................... 323/312 |

\* cited by examiner

*Primary Examiner*—Wendy Garber
*Assistant Examiner*—Jacqueline Wilson
(74) *Attorney, Agent, or Firm*—Helfgott & Karas, P.C.

(57) ABSTRACT

An apparatus for powering one or more television cameras through an information signal transmission line wherein the television camera is operated by a constant DC current and outputs multiplexed electrical information signals is provided with a constant current supply unit and a rechargeable battery for powering the television camera when the constant DC current is cut off. A transmission line connects the television camera with the constant current supply means for feeding the television camera with the constant DC current and feeding the current supply unit with the multiplexed electrical information signals. The constant DC current provided by the constant DC current supply unit is equal to the sum of a constant current required for operating the television camera and a constant current required to charge the rechargeable battery.

36 Claims, 8 Drawing Sheets

APPARATUS FOR POWERING TELEVISION CAMERAS VIA CAMERA TRANSMISSION LINES

FIELD OF THE INVENTION

This invention relates to a television camera apparatus provided with a motorized pan and tilt positioning, or positioning of motorized devices such as zoom lenses used with television cameras, and more particularly used in a monitoring system.

DESCRIPTION OF THE PRIOR ART

A television camera apparatus used for a monitoring system is mounted on a remotely controlled motorized pan-tilt head that positions the camera for observation from different angles. Such television cameras may use remotely controlled motorized zoom lens, and may be mounted inside the case having a front glass pane with a motorized wiper mechanism, and having a fan or a heater for cooling or heating the camera. Such television cameras are remotely controlled and can be automatically re-positioned by energizing all or some of the motors simultaneously.

Such cameras require a power supply having a sufficient capacity to power the camera itself and any of the individual motors, or all the motors and other peripherals simultaneously. Therefore, such television camera that is remotely operated and consumes power at random is powered via an exclusive heavy power cable connected to the exclusive power supply, which is laborious and costly.

On the other hand, televisions cameras that are mounted onto a fixed non-movable mount and use fixed, or manually adjustable lens do not consume power at random. Such cameras with stable constant current drain make use of the transmission line, drawn between the camera and the monitoring site, for applying power to the camera. The transmission line may also be used for propagating an external synchronizing signal from the monitoring site to the camera.

Such apparatus for externally synchronizing television cameras, is an apparatus for transmitting an external synchronizing signal from an external synchronizing signal generator to the television cameras by injecting the external synchronizing signal into the video signal transmission line and locking an internal synchronizing signal generator of the television camera by means of the transmitted external synchronizing signal. Such an apparatus is disclosed in U.S. Pat. No. 4,603,352 the contents of which are incorporated herein by reference.

When the monitoring system employs a plurality of television cameras, such television cameras will transmit video, audio and I.D signals through the video transmission line to the monitoring site, while control signals may be propagated to the camera from the monitoring site via the same video transmission line. Such monitoring system apparatus which employs a plurality of television cameras, transmits video, audio and I.D signals to the monitoring site and propagates control signals and external synchronizing signal to the cameras, via the same transmission line is disclosed in U.S. Pat. No. 5,579,060 the contents of which are incorporated herein by reference.

In all such systems, where the video, audio, ext. sync, I.D and control signals are propagated through the video transmission line, along with power for powering the camera, the current drain through the transmission line must be regulated and stable because otherwise it will disturb the transmission of the signals.

It will be impossible to power any of the above television cameras through the video transmission line whenever starting up of the motors causes current surges and/or random current is drained by the television camera and any of its pan-tilt motors, zoom lens motors, and/or other current draining peripherals.

SUMMARY OF THE INVENTION

It is an object of the present invention to provide an apparatus for powering a television camera along with powering its motorized positioning devices and other power consuming peripherals through the camera transmission line extending between the television camera and the receiving site, for transmitting video and audio signals generated by the television camera along with an identification code identifying the television camera, and at the same time, ensure propagation of external synchronizing signals and control signals to the television cameras through the same transmission line.

The above and other objects are attained by an apparatus for powering television cameras via camera transmission lines, comprising a single television camera or a plurality of television cameras each processing an electrical information signal including a video signal, a single current supply means or a plurality of current supply means for applying constant current to the television camera, a single transmission line or a plurality of camera transmission lines for respectively connecting each television camera with each current supply means, and an external synchronizing signal generating means for generating an external synchronizing signal and applying the same to the plurality of the television cameras and to a receiving means.

Each current supply means includes a feeding circuit for feeding the information signal to the receiving site through a corresponding information transmission line. The receiving site may include a selection circuit for selecting one of the plurality of corresponding information transmission lines or switching over from one information transmission line to another. The selection and the switching-over timing of the information signals through the selection circuit is synchronized with the external synchronizing signal.

Each camera transmission line corresponds to a combination of the current supply means and television cameras, and each television camera is powered and transmits an information signal to the receiving site through the corresponding camera transmission lines. The information signals from the single television camera or each of the plurality of television cameras are fed to each respective current supply means. The information signal output from each current supply means can be connected to a television monitor through a single information transmission line or to any one of the plurality of the inputs of the selection circuit of the receiving site through a plurality of corresponding information transmission lines.

Power fed to each television camera through the camera transmission line is a constant current which is maintained at a predetermined level by a current regulator circuit incorporated in the current supply means. The predetermined current is the sum of the constant current consumed by the television camera circuits and the additional constant current fed to a rechargeable battery connected to the television camera. As the charged battery provides energy for driving the motors and any other peripherals that present a variable or random current drain and/or current surge, the camera can be remotely controlled or automatically operate any of the positioning motors or other current draining peripherals individually or all the motors and other peripherals simultaneously, without disturbing the propagated signals through the camera transmission line. The charge battery can also power the camera circuits when the constant current fed to the camera is cut or switched off.

Each current supply means includes a signal separation/injection circuit to remove the information signals generated by the television camera that are propagated through the camera transmission line from the DC, and feed the separated information signals to an information signal output terminal. The external synchronizing signal along with control signals generated by the receiving site can be fed in a reverse direction through the information signal output terminal and through the signal separation/injection circuit and via the camera transmission line to the television camera, or it may be fed directly to the camera transmission line via an injection circuit through separate control and/or external synchronizing signal terminals.

Each television camera incorporates a DC separation circuit to separate the DC from the ext. sync signals and control signals generated by the receiving site and feed the separated ext. sync signals and control signals to an ext. sync and control signal processing circuits. The separated DC is fed to the television camera circuits via a constant current control circuit and to the rechargeable battery through a battery control circuit. Each television camera further includes a video signal injecting circuit and may also include an I.D code signal injecting circuit and an audio signal injecting circuit, for injecting video, audio and I.D signals to the camera transmission line. As the signals are mutually injected into the camera transmission line, they become a combined information signal fed to the receiving site via the current supply means and the information transmission lines.

The switching-over of the information signals is timed by and external synchronizing signal to occur precisely along with the vertical synchronizing timing, thereby providing an uninterrupted synchronizing process so that the reproduced video images are not disturbed during and immediately after the switch-on or switch-over operation.

According to the present invention the receiving site is connected to a plurality of television cameras through a plurality of corresponding camera transmission lines and via information transmission lines, and the switch-over timing of the information signals in the selection circuit of the receiving site is synchronized with the external synchronizing signal. Therefore, even when a large number of television cameras are involved, any of the information transmission lines connecting the current supply means and the receiving site can be synchronously switched-over by a simple apparatus without disturbing reproduced video images.

Each of the television cameras includes an internal synchronizing signal generation circuit for generating an internal synchronizing signal synchronized with the external synchronizing signal.

According to the present invention, the external synchronizing signal is a pulse signal having a voltage level higher than the maximum voltage level or lower than the minimum voltage level of the composite video signal. The external synchronizing signal generator includes a circuit for injecting the external synchronizing signal into the information transmission lines connecting the current supply means and the receiving site, or directly into the current supply means. Each television camera further includes a level comparison circuit for extracting the external synchronizing signal by comparing the signal level of the external synchronizing pulse signal with a reference signal having a predetermined voltage and feeding the extracted external synchronizing signal to the internal synchronizing signal generation circuit. Since the external synchronizing pulse is generated during the vertical blanking period of the video signal, the external synchronizing signal can be transmitted through the same transmission line used for transmitting the video signal without affecting the video signal.

In an embodiment, the receiving site may preferably include a circuit for removing the external synchronizing signal from the output signal fed through the corresponding information transmission lines to the receiving site. Thereby, since the external synchronizing signal can be removed from the video signal processed by the receiving site, the external synchronizing signal does not influence the receiving site circuits and the video signal can be flawlessly received.

In an embodiment, each of the television cameras may further include an identification code signal generation circuit for generating an identification code signal corresponding to an identification number, respectively allotted to each television camera, and injecting the identification code signal into a video signal fed to the receiving site. The receiving site further includes an identification code signal processing means for extracting the identification code signal from the output signal of the selection circuit and for feeding a signal corresponding to the extracted identification code signal to the video signal processing means.

The identification code signal processing means preferably includes a memory for storing identification data for each allotted code number, a decoding circuit for decoding the identification code signal extracted form the output signal of the selection circuit for generating a decoded signal, and a control circuit for retrieving the identification data on the basis of the decoded signal from the memory and for superimposing the retrieved identification data onto the video signal. Thereby, the processed video signal can be identified by the identification code signal processing means for verification of the television camera which is transmitting the video signal, thereby, providing the basis for the error-free control of the television cameras.

The apparatus of the present invention may further comprise a control circuit for generating and feeding a control signal combining a coded control command along with the identification code signal, decoded and fed by the decoding circuit, for controlling television cameras. The coded control command is fed to the television cameras for operating the television cameras only when the identification code signal, combined into the control signal, corresponds to the identification number allotted to the television cameras being controlled. Thereby, only a specific television camera, having its identification code extracted and decoded by the control circuit during the controlling process, can have its allotted identification number coincide with the identification code extracted from the control signal fed from the control circuit. Therefore, controlling of any specific television camera is verifiable.

The receiving site may further include a control signal driver for injecting the control signal to the single information transmission line, or to the plurality of the information transmission lines or the camera transmission lines, in the reverse direction to the direction of propagation of the video signal.

The control signal can be injected into an information transmission line connecting the current supply means to the receiving site, or directly into the camera transmission line via an injection circuit through the control terminal of the current supply means for transferring the control signal to the television camera during the vertical blanking period of the video signal, and the television camera may further include a control signal processing means for extracting the control signal from the camera transmission line and feeding the extracted control signal only when the identification code signal, which is combined into the control signal, corresponds to the identification code allotted to it. Since the control signals are transmitted during the blanking period of the video signal they can be transmitted to the television cameras from the receiving site through a common transmission line without disturbing the video signal.

Thereby, both the video signal and the control signal can be bi-directionally transmitted between the receiving site and the television cameras through the current supply means and a common transmission line.

Each television camera preferably further includes a signal mixing means for generating a mixed signal composed of a video signal and an audio signal by injecting the audio signal into the video signal and feeding the mixed signal through a corresponding camera transmission line, via the current supply means and via the information transmission line to the receiving site. Thereby, both the mixed video signal and the audio signal can be transmitted between the television camera and the receiving means through a common transmission line.

Each current supply means or the receiving site may further include an audio signal retrieving means for outputting an audio signal by retrieving the audio from the mixed signal.

BRIEF DESCRIPTION OF THE DRAWINGS

The foregoing objects and features of the present invention will become apparent from the following description of preferred embodiments of the invention with reference to the accompanying drawings, in which.

DETAILED DESCRIPTION OF THE PREFERRED EMBODIMENTS

Figure 1:
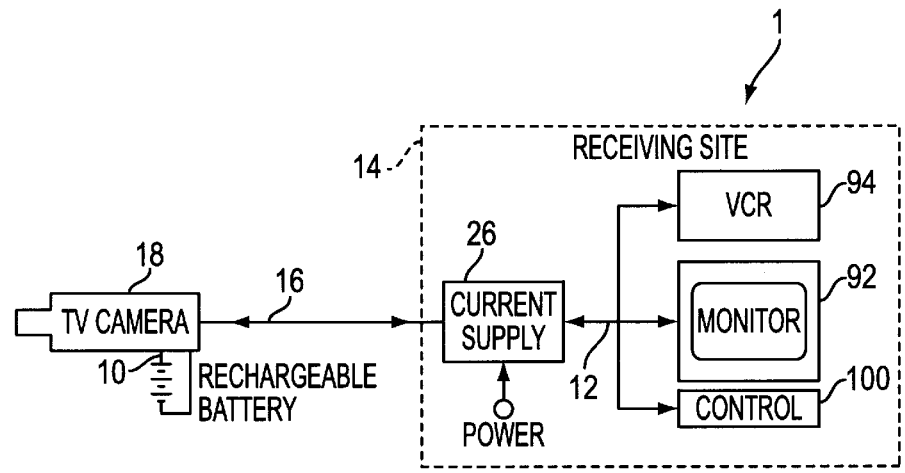
FIG. 1 is a block diagram of an apparatus for powering a television camera via an information transmission line of a preferred embodiment of the present invention.

FIG. 1 shows an apparatus for powering a single television camera via an information signal transmission line as a preferred embodiment when applying the present invention to a closed circuit television system, such as a monitoring system. An information signal in the following description may consist of video signals only, or of a combination of video, audio and/or identification signals propagated from the television camera to the receiving site, along with camera control signals and/or external synchronizing signals propagated from the receiving site to the television camera. A video signal in the following description may be a video portion of a composite video signal or a composite video signal or a digital video signal.

Referring now to FIG. 1 in detail, an apparatus for powering a television camera 1 of the present invention comprises a television camera 18 for transmitting an information signal, a current supply unit 26 for receiving and transferring information signals to and from a receiving site 14 and for supplying constant current to power the television camera 18, a camera transmission line 16 for propagating information signals between the camera and the current supply unit 26 and for carrying the constant current supply from the current supply unit 26 to the television camera 18, a television monitor 92 for displaying video images, a video cassette recorder 94 for recording video images, a camera control circuit 100 for transmitting a control command for remotely operating the television camera 18, a rechargeable battery 10 for providing the energy source needed for operating motors or other current consuming peripherals of the television camera 18, and an information transmission line 12 for propagating information signals between the current supply unit 26 and the receiving site.

Figure 2:
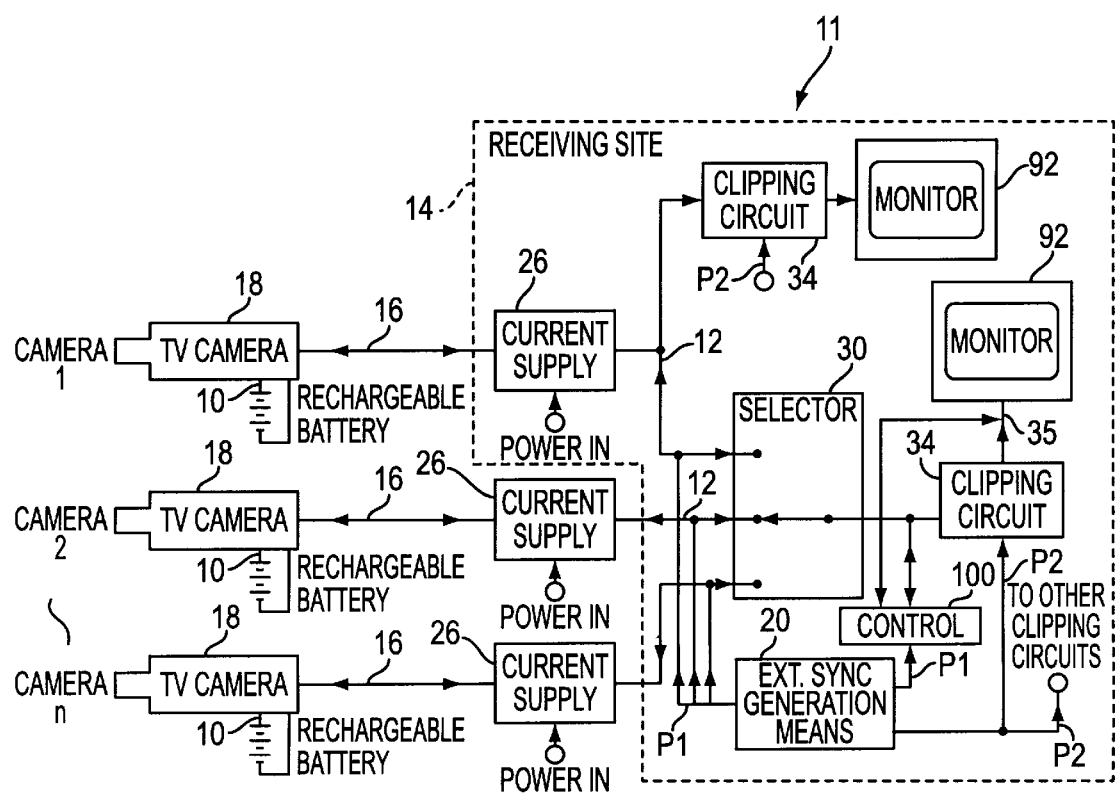
FIG. 2 is a block diagram of an apparatus for powering a plurality of television cameras through respective information transmission lines of another preferred embodiment of the present invention.

FIG. 2 shows an apparatus 11 for powering a plurality of television cameras via information signals transmission lines as a preferred embodiment when applying the present invention to a closed circuit television system such as a monitoring system.

Referring to FIG. 2, an apparatus for powering a plurality of television cameras 11 comprises a plurality of television cameras 18 for transmitting information signals, a plurality of current supply units 26 for receiving and transferring the transmitted information signals to and from the receiving site and for supplying constant current to the television cameras 18, a plurality of camera transmission lines 16 for propagating information signals between cameras 11 and the current supply units 26 and for carrying the constant current supply from the current supply units 26 to the television cameras 18, a single television monitor or a plurality of television monitors 92 for displaying video images, a plurality of rechargeable batteries 10 each for providing the energy source needed for operating the motors or other current consuming peripherals of each television camera 18, information transmission lines 12 for propagating information signals between the plurality of current supply units 26 and the receiving site 14, a selector circuit 30 for selecting information signals, an external synchronizing signal generator 20 for synchronizing television cameras 18, selector 30 and the camera control circuit 100, a synchronizing signal clipping circuit 34 for clipping and removing synchronizing pulses from the information signals, and camera control circuit 100 for transmitting a control command for remotely operating the motors or other current consuming peripherals of the television cameras 18. The control circuit 100 can also generate control commands to the television camera for adjustments and setup of the television camera circuitry or functions which are unrelated to the current consuming peripherals.

Each information transmission line 12 corresponds to the number of the current supply units 26, the cameras transmission line 16 and the television cameras 18. The information transmission line 12 of FIG. 1 is connected at one end to the control circuit 100 and to the monitor 92, while each of the information transmission lines 12 of FIG. 2 is connected to each input of the selector circuit 30 and/or to monitor 92. The selector circuit 30 is located at the receiving site 14. The other end of each of the transmission lines 12 is connected to the information signal output terminal of the respective current supply unit 26. Current supply units 26 are located anywhere between the receiving site 14 and the television cameras 18. The current supply units can also be assembled into an integral part of selector 30 or be placed at the receiving site, in which case the information transmission lines 12 become internal connection lines of the receiving site. The monitor 92, the video cassette recorder 94, the external synchronizing generator 20 and the control circuit 100 are all mounted at or near the receiving site or in a monitoring room. On the other hand, the television cameras 18 are mounted randomly anywhere for observing near or remote locations and each of the television cameras 18 is connected through a camera transmission line 16 to the current supply unit 26, using a video signal transmission cable such as a coaxial cable, or a twisted pair.

Figure 5:
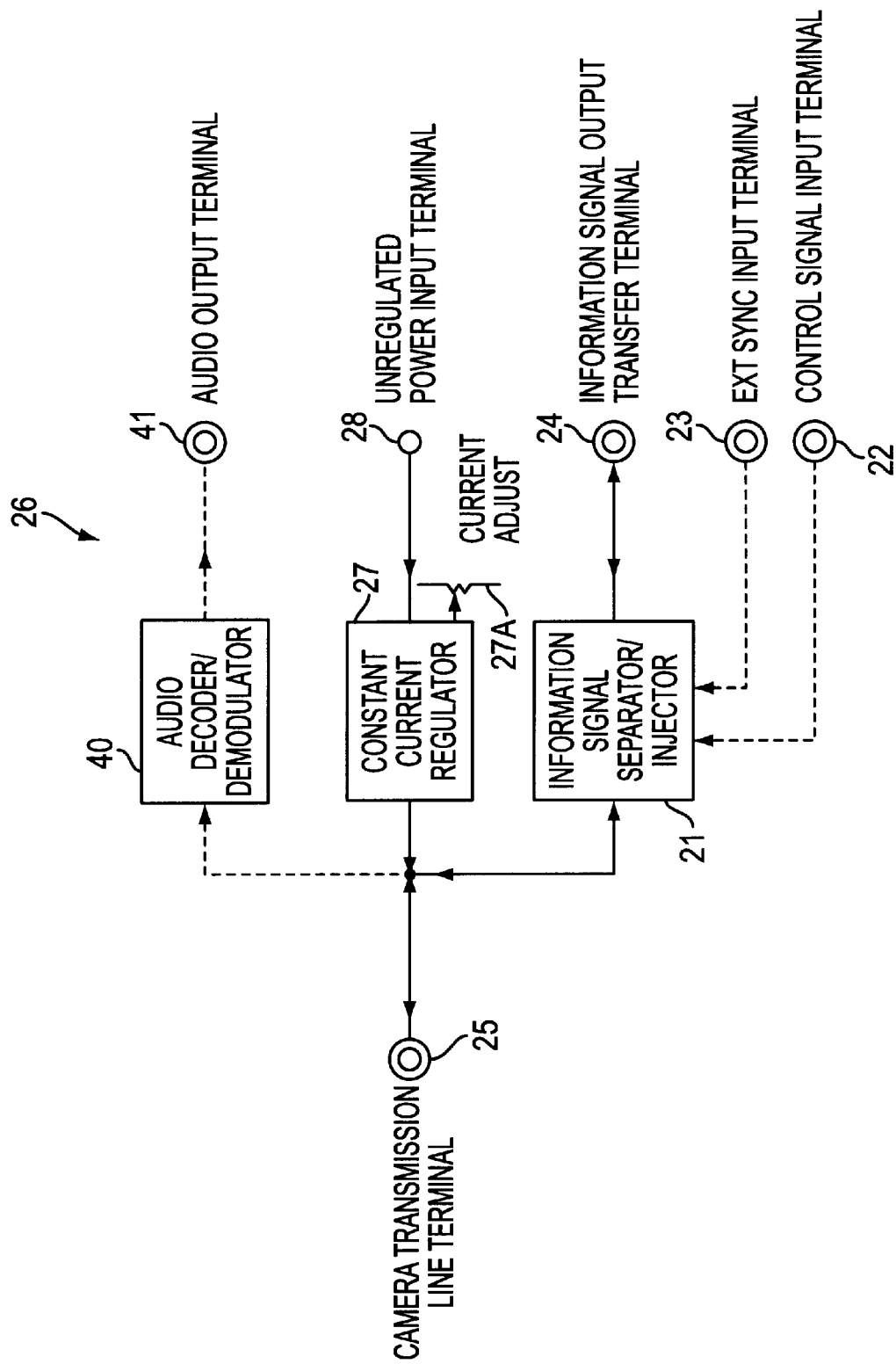
FIG. 5 is a block diagram of an electric circuit of a current supply apparatus of the apparatus shown in FIGS. 1 and 2.

The current supply unit 26 shown in FIG. 5 is connected to the TV camera 18 via transmission line 16 couple to the TV camera at transmission line terminal 25. The current supply means 26 is which is fed from a non-regulated DC power source or a rectified AC power source through its input power terminal 28 employs a well known constant current regulator 27 for supplying television camera 18 with constant current equal to the camera current consumption plus a constant charge current for charging the rechargeable battery 10 shown in FIGS. 1, 2 and 3. The current for charging the battery can be set to any calculated value by means of a current adjuster 27A shown in FIG. 5 to ensure that the rechargeable battery is sufficiently charged to operate the positioning motors or other peripherals, such as a heater, a wiper, a pane washer or a cooling fan. The rechargeable battery 10, such as a nickel/cadmium battery having different sizes and power capacity, can be used; alternatively any other type of rechargeable battery and capacity can be selected. The battery 10 can be installed inside a camera housing or at the camera site and connected via separate power cables to the television camera. The rechargeable battery can also be used for powering television camera circuits when power to the current supply unit is cut.

Figure 3:
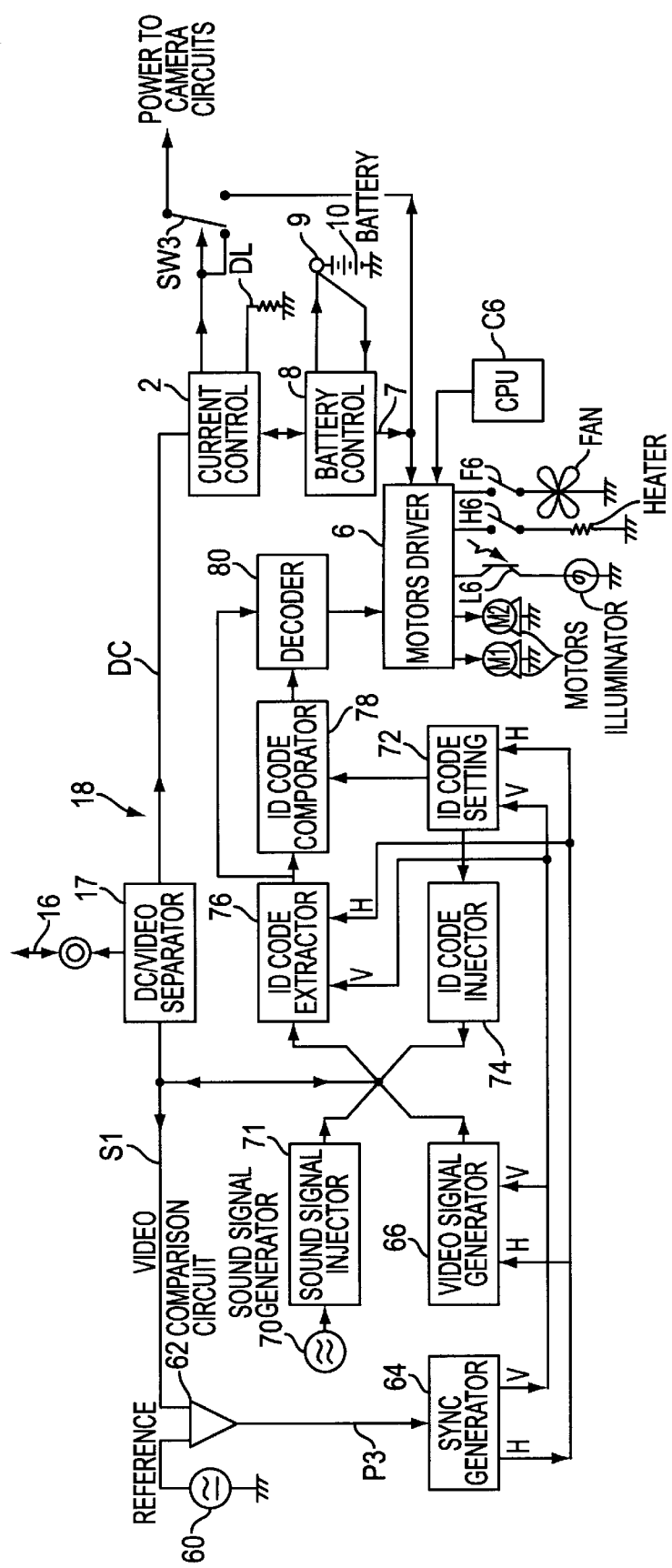
FIG. 3 is a block diagram of an electric circuit of a television camera apparatus of the apparatus shown in FIGS. 1 and 2.

As shown in FIG. 3 the camera transmission line is connected to a DC/video signal separator circuit 17 for separating the DC and the video signals. The separator circuit 17 consists of a well known coupling capacitor for coupling the signals and blocking the DC from the signal processing circuits and well known RF filters for removing the signals from the DC. The separator circuit 17 may consist of signal transformers for retrieving of information signals from the DC and RF traps for the removal of the information signals from the DC line. The filtered DC line is fed from the separator circuit 17 to the current control circuit 2. The current control circuit 2 incorporates a dummy load DL to replace the battery charge current in the event when the battery polarity is reversely connected to a battery terminal 9 or when the battery 10 is disconnected.

Figure 4:
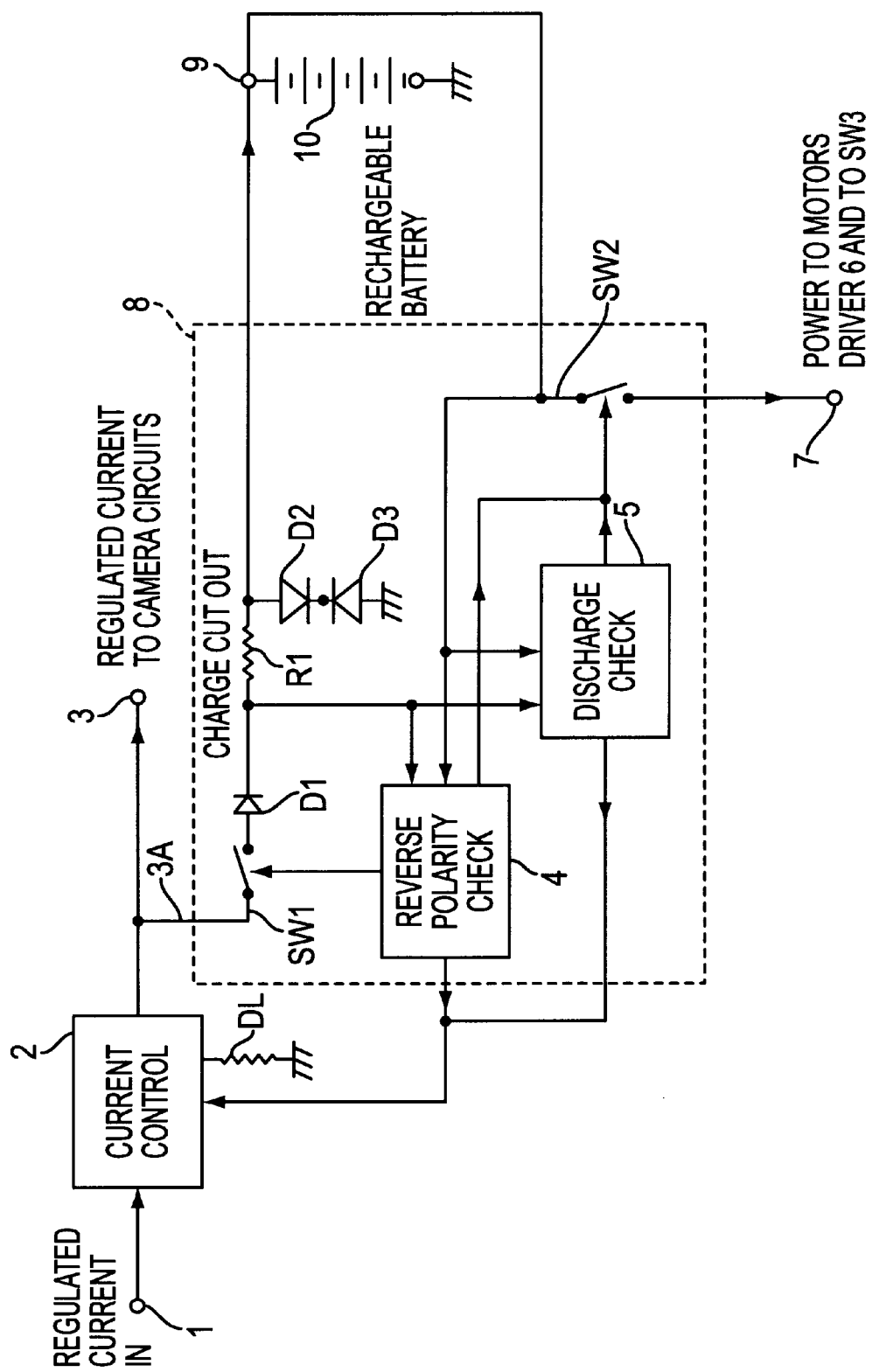
FIG. 4 is a block diagram showing the current and battery control circuits of the apparatus of FIG. 3.

In the event of reverse battery polarity connections or in the event of battery disconnection there will be no battery charge current and this will cause an over-current supply to the television camera circuits by the regulated constant current fed to the television camera, which may result in the damage to the television camera 18. To prevent such damage the current control circuit 2 shown in FIG. 4 is fed from a battery control circuit 8 with a "no charge" signal for connecting a dummy load DL to drain a current equal to the charge current, thereby ensuring that the television camera circuits are fed with a proper constant current.

The current control circuit 2 may employ a switching transistor for connecting the dummy load resistor DL, while the signal for switching the transistor is a high-low signal fed from the battery control circuit 8. As can be seen from FIG. 4, the battery control circuit 8 for controls rechargeable battery 10 consists of a discharge check circuit 5 for checking the battery voltage supply, a reverse polarity check circuit 4 for checking the battery polarity connection, a charge cut-out switch SW1 for switching the charge current off when the battery polarity is reversely connected, an output switch SW2 for cutting off the output for preventing disturbance to the information signal propagation, tow diodes D1 and D2 and a charge current resistor R1 along with a Zener diode D3 for controlling the current flow.

The discharge check circuit 5 and reverse polarity check circuit 4 are fed with reference voltages from the charge line 3A and the battery terminal to generate a "shut down" signal to the output switch SW2 when the battery 10 is disconnected or discharged or reversely connected, thereby shutting off the output current to eliminate a random current drain from the charge line 3A and preventing disturbance to the information signal flow by a non-stable current drain during the discharged state, reverse polarity battery connection or battery disconnection. Similarly, a reversely connected battery is prevented from feeding the wrong polarity output that may damage and/or wrongly operate the motors or other current consuming peripherals. The reverse polarity check circuit 4 also generates a "reverse polarity" signal for switching off the charge switch SW1 to prevent damage to the battery 10 in the event of the reverse polarity connection. Diode D1 prevents an unwanted reverse current from the battery to the camera circuits when the current supply unit 26 is switched off; resistor R1 limits the current to the battery, while diodes D2/D3 protect the battery from the over-voltage and surges. However, many other well known arrangements and part selection can be made for protecting the battery polarity connection, the current direction, the current flow, against the current surge and ensure the over-voltage protection.

The discharge check circuit 5 and the reverse polarity check circuit 4 may employ a well known differential or voltage comparator circuits for level detections, while the charge cut-out switch SW1 and the output cutout switch SW2 may employ switching transistors, photo-couplers, relays or other well known circuit interrupters. The battery 10 shown in FIG. 4 feeds its current through the output cutout switch SW2 to an output terminal 7. As shown in FIG. 3, the output terminal is connected to a motor drive circuit 6 for feeding the motors and other current consuming peripherals of the camera 18 as well as to the switch SW3 which is controlled by the regulated constant current supplied to the television camera circuits and will switch over to power the television camera circuits by the rechargeable battery when no regulated constant current is present.

The current supply unit 26 receives the information signal from the corresponding television camera 18 through the respective camera transmission line 16 and feeds the received signal to an input of the selector circuit 30 through the information transmission lines 12. Thus, the plurality of current supply units 26 act as relay circuits for transferring information signals to the plurality of the inputs of the selector 30 through the information transmission lines 12. The selector circuit 30, composed of a plurality of electronic switches corresponding to the information transmission lines 12, is incorporated in the receiving site 14 for receiving information signals transmitted from the plurality of television cameras 18 and switch on one or more of the electronic switches for connecting one or more information transmission lines to single monitor or multiple monitors 92, or to video cassette recorders 94. Monitor 92 can be connected directly to any of the information transmission lines 12 for displaying the respective signals of the television camera 18. Thereby, any one or more information signals transmitted through the information transmission lines 12 can be selected and fed from the selection circuit 30 to the monitors 92 or VCRs 94 or directly to the monitors and/or VCRs. The selector 30 shown in FIG. 2 includes a mechanical selector switch. However, selector 30 can be a well known ICs such as an electronic multiplexer or a matrix switch, with multiple outputs for independent selections of any input into any output.

Figure 6:
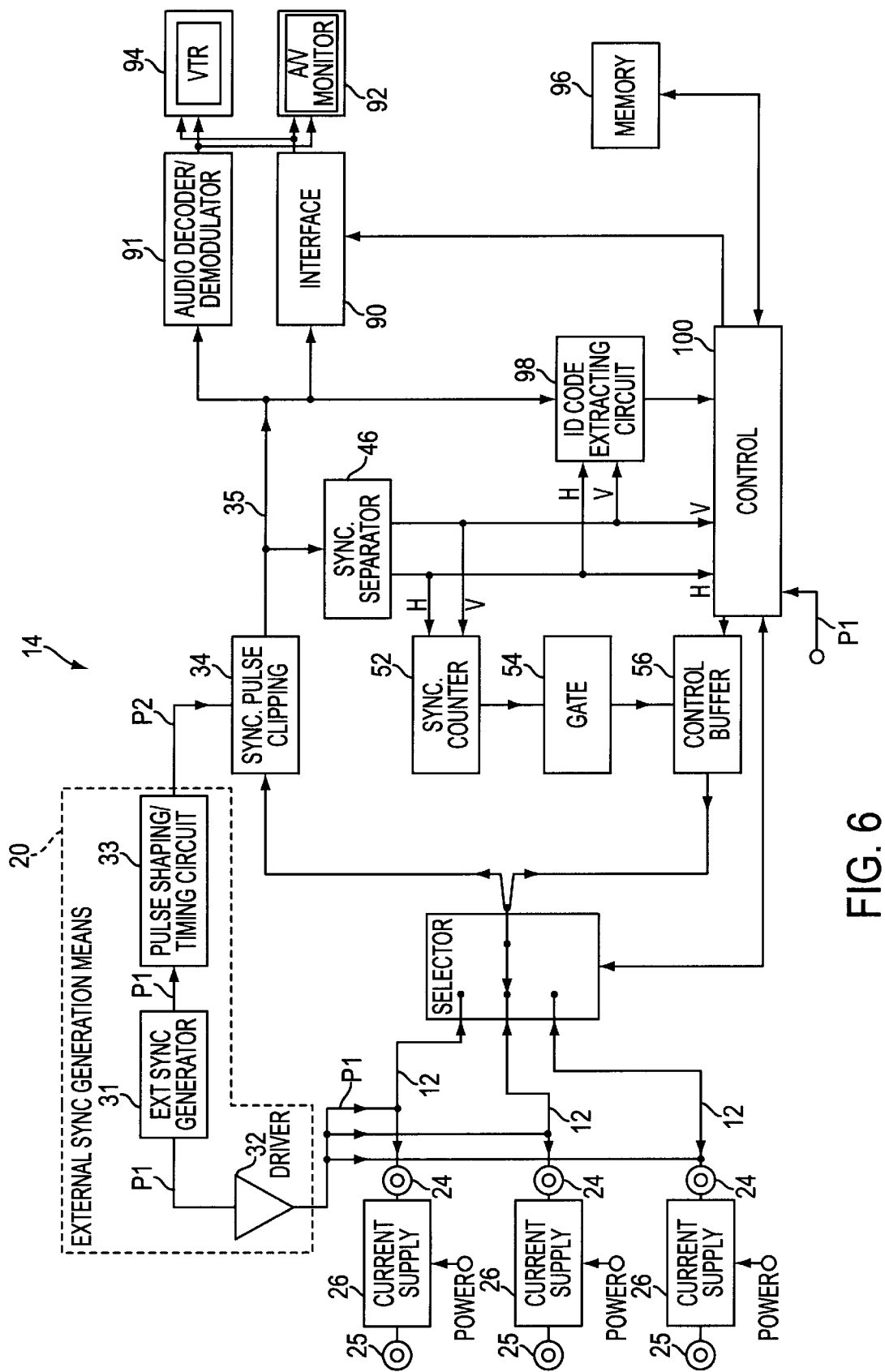
FIG. 6 is a block diagram of an electric circuit of a receiving site of the apparatus of FIG. 2.

FIG. 6 shows the electric circuit of the receiving site in detail. The frequency of an external synchronizing signal P1 shown in FIG. 6 is related to the vertical frequency of the video signal generated by the television camera 18, preferably having a frame or field scanning frequency. For instance, in the case of an NTSC system, the frame frequency is 30 Hz, and the field frequency is 60 Hz. In such case, the frequency of the external synchronizing pulse P1 is either frame frequency of 30 Hz or a field frequency of 60 Hz. However, the external synchronization pulse train can be composed of vertical and horizontal scanning frequencies and transmitted during the corresponding vertical and horizontal blanking periods.

Figure 7A:
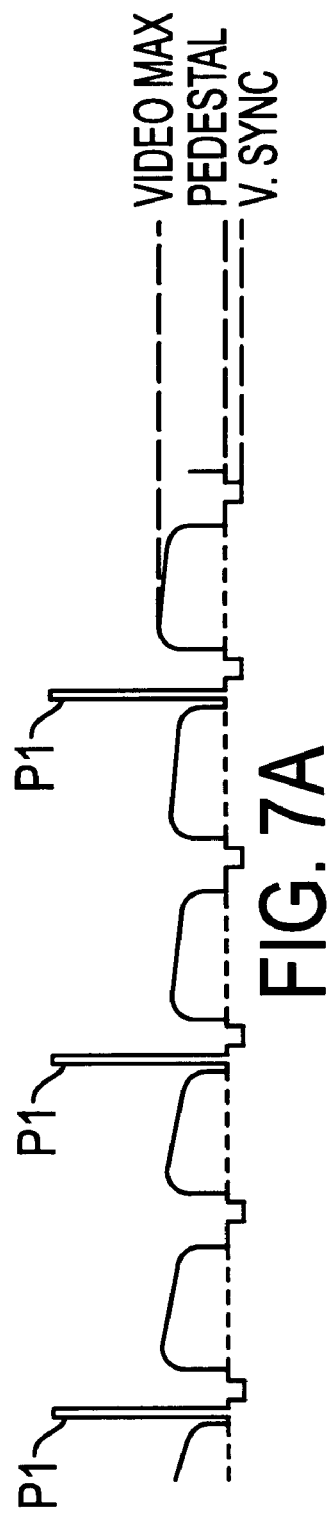
FIGS. 7(a), 7(b) and 7(c) show waveforms of a signal transmitted by the circuit of FIG. 6.

As shown in FIG. 7(a), the time the external synchronizing signal P1 is generated adjoins the vertical synchronizing pulse, occurring during the vertical blanking period of the video signal transmitted from the television camera 18 shown in FIG. 2. Thereby, the external synchronizing signal P1 can be fed to the television camera 18 through the information transmission line 12 and through the camera transmission line 16 that propagates the video signal without affecting the video signal. The voltage level of the external synchronizing signal P1 is preferably made higher than the composite video signal. However, the voltage level of the external synchronizing signal P1 may be lower than the composite video signal.

In the following description, a frame external synchronizing pulse having a voltage level higher than the white level of the video signal, in particular, a frame external synchronizing pulse corresponding to the phase of a second field is used as the external synchronizing signal P1.

In the illustrated embodiment of FIG. 2, each television camera 18 is a television camera operated in synchronization with the external synchronizing signal P1. For such a television camera, a well known television camera may be used synchronized with an external synchronizing signal having a voltage level higher or lower than that of the information signal, as disclosed in U.S. Pat. No. 4,603,352.

Each of the television cameras 18 is allotted an identification number for generating respectively an identification code made of numbers such as 1, 2, 3 . . . n, for injecting the identification code into the video signal during the vertical blanking period.

Each of the television cameras 18 includes a circuit for generating code signals corresponding to the identification code, and a circuit for generating a composite signal wherein the code signals are injected into the video signal. Such an apparatus is disclosed in U.S. Pat. No. 4,943,864, the contents of which are incorporated herein by reference; therefore, each of the information signals received by the receiving site 14 incorporates identification code.

Figure 7B:
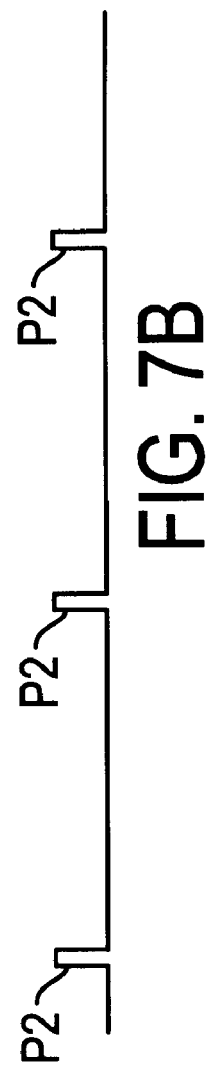

As shown in FIG. 6, each receiving site 14 includes a pulse shaping/timing circuit 33 for outputting a pulse signal P2 shown in FIG. 7(B) synchronized with the external synchronizing signal P1 fed from the external synchronizing signal driver or injection circuit 32 also receives the pulse signal P1 fed from the external synchronizing signal generating circuit 31 and injects the pulse signal P1 into the information signal transmission lines 12.

Instead of injecting the pulse signal P1 to each information transmission line 12 the circuit 32 can inject the external synchronizing pulse P1 into each current supply means 26 for injecting the pulse P1 into each camera transmission line 16. As shown in FIG. 5 the current supply unit 26 includes an information signal separator/injector circuit 21 for separating the information signals from the DC fed to the camera transmission line 16, or to inject information signals into the camera transmission line 16. The signal separator circuit is similar to the DC separator circuit 17 shown in FIG. 3, whereby the signal separation is achieved by means of coupling capacitors or signal transformers which couple the different components of the information signal two way and block the DC components present on the camera transmission line 16. Accordingly, the external synchronizing pulse P1 fed from the external synchronizing signal injection circuit 32 of the receiving site 14 shown in FIG. 6 can be fed into the external synchronizing input terminal 23 and injected into the camera transmission line 16 through the signal separator/injector circuit 21 shown in FIG. 5.

The synchronizing pulse clipping circuits 34 shown in FIG. 2 are provided for clipping the synchronizing pulse P1 from a signal fed from any of the information transmission lines 12 or through the output of the selector 30 and through the synchronizing pulse clipping circuits 34, by using the timing signal P2 to clip pulse P1 and feed a video signal containing no synchronizing pulse P1 to the receiving line 35 and to any television monitor 92.

Figure 7C:
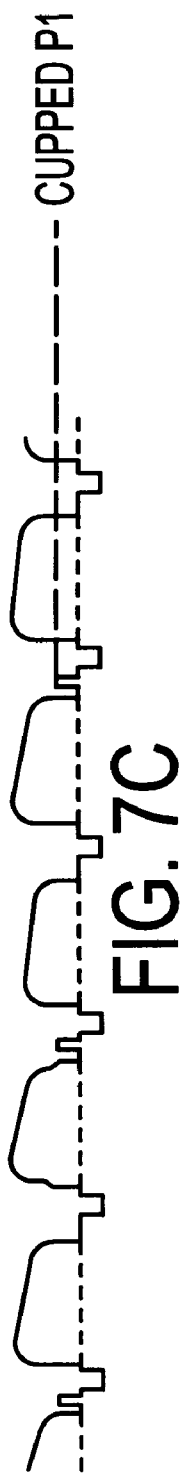

Each synchronizing pulse clipping circuit 34 is fed with the signal shown in FIG. 7(A) from the respective information transmission line 12 and the timing signal P2 shown in FIG. 7(B) from the pulse shaping/timing circuit 33. The signal P2 activates the clipping circuit 34 for the duration of P2, thereby the clipping circuit 34 clips the entire signal portion of the signal fed to its input terminal above the black level Vb of the video signal during the period of signal P2. Since the duration of P2 covers the period of the external synchronizing pulse P1 the external synchronizing signal P1 is removed by the clipping circuit 34 from the composite video signal transmitted to the receiving site 14, as shown in FIG. 7 (C). Though pulse P2 shown in FIG. 7(B) is a positive pulse any other pulse size and polarity that is timed to coincide with pulse P1 7(A) can be used to activate the clipping circuit 34 shown in FIG. 6.

Accordingly, even though the external synchronizing signal P1 is present in the video signal fed from the television camera 18 through the transmission line 12 it is removed by the clipping circuit 34; therefore the external synchronizing signal P1 injected into the information transmission line 12 will synchronized the television camera 18 and will not cause any receiving error at the receiving site 14. Instead of locating the clipping circuit 34 at the output of the selector 30 it is possible to incorporate plurality of clipping circuits 34 into each camera transmission line 16 or into each information transmission line 12.

The control circuit 100 of the receiving site 14 of FIG. 1 is similar to the control circuit 100 of the receiving site 14 of FIG. 2; however the control circuit 100 of the receiving site 14 of FIG. 2 generates a selection signal for selecting a television camera 18 through the selector 30 which is not needed from the control circuit 100 of receiving site 14 of FIG. 1. The receiving site 14 (FIG. 6) includes a synchronizing separator circuit 46 for separating the horizontal and vertical synchronizing signals H and V from the composite video signal fed to the information transmission line 12 or to the receiving line 35. The control circuit 100 also generates a control signal for operating the corresponding television camera 18 during predetermined timing on the basis of the separated synchronizing signals H and V and feeds the control command to a control buffer 56. A counter 52 is provided for counting the number of horizontal scanning lines fed from the sync separator 46 during each frame or field. The control signal processing part also includes a gate circuit 54 for generating a gate signal when the counted value of the counter 52 is a predetermined value, and a buffer circuit 56 controlled by the gate signal for injecting the control signal fed from the control circuit 100 into the video signal at the selector output pole. It can be injected into the video signal at each information transmission line 12 or directly into each control signal input 22 of the current supply units shown in FIG. 5 for injection through the signal separator/injector circuit 21 into the camera transmission line 16.

In the preferred embodiment of the present invention, the injector circuit 21 may include a mixer circuit wherein the code signals are mixed and injected into the composite video signal. Such mixer circuit is disclosed in U.S. Pat. No. 4,989,085, the contents of which are incorporated herein by reference, or it can be an injection circuit disclosed in U.S. Pat. No. 5,335,014, the contents of which are incorporated herein by reference.

The control command generated by the control circuit 100 may include a control code for switching wiper on-off, tilting up-down, panning left-right and zooming tele-wide or the like, or a start or stop command of the transmission of a video signal. The control signal may also combine the control code corresponding to the control command and the identification code respectively allotted to each of the television cameras 18. In addition, the control signal is injected into the information transmission line 12 by the buffer circuit 56 of FIG. 6 at a predetermined time within the vertical blanking period. The injection timing of the control signal into the information transmission line 12 is different from the injection timing of the external synchronizing signal into the information transmission line 12.

It is apparent from the above description that both the external synchronizing signal and the control signal can be transmitted from the receiving site to the corresponding television camera through the respective information transmission line 12 and camera transmission line 16.

As shown in FIG. 3, each television camera 18 includes a reference signal source 60 which feeds a reference signal voltage to a comparison circuit 62 for separating the external sync pulse by comparing the voltage level of the external synchronizing signal P1 transmitted from the receiving site 14 through the information transmission lines 12 and camera transmission line 16 with a reference signal form the reference signal source 60 and generating a pulse signal P3 when P1 level is same or larger than the reference signal. An internal synchronizing signal generation circuit 64 generates internal synchronizing signals H and V synchronized with the pulse signal P3 fed from the comparison circuit 62. A video signal generation circuit 66 generates a video signal synchronized with the internal synchronizing signals H and V for feeding it to the video signal transmission line S1. An audio signal generation circuit 68 generates audio signal along with the video signal and an audio signal injection circuit 70 injects the audio signal into the video signal transmission line S1. The DC/video separator circuit 17 feeds the video signals or the mixed video and audio signals through the coupling capacitors of the signal separation circuit 17 to the camera transmission line 16 in the same manner as the signal separator/injector circuit 21 of the current supply means of FIG. 5 injects the information signals into the camera transmission line 16.

As shown in FIG. 3, each television camera 18 further includes an identification code setting circuit 72 for generating an identification code respectively allotted to the television camera 18 at a predetermined time within the vertical blanking period of the composite video signal on the basis of the internal synchronizing signals H and V, and an identification code injection circuit 74 for injecting the identification code fed from the code setting circuit 72 into the video signal transmission line S1.

The timing of the identification code injection into the video signal transmission line S1 by the injection circuit 74 is different from the timing the control signal is injected into the information signal transmission line 12 by the receiving site 14 shown in FIG. 6. The control signal is injected into the information transmission line 12 by the receiving site 14 during one or more predetermined horizontal scanning lines during the vertical blanking period of the composite video signal, while the identification code is injected into the video signal transmission line S1 by the television camera 18 during one or more predetermined different horizontal scanning lines during the same or another vertical blanking period of the composite video signal.

Figure 10A:
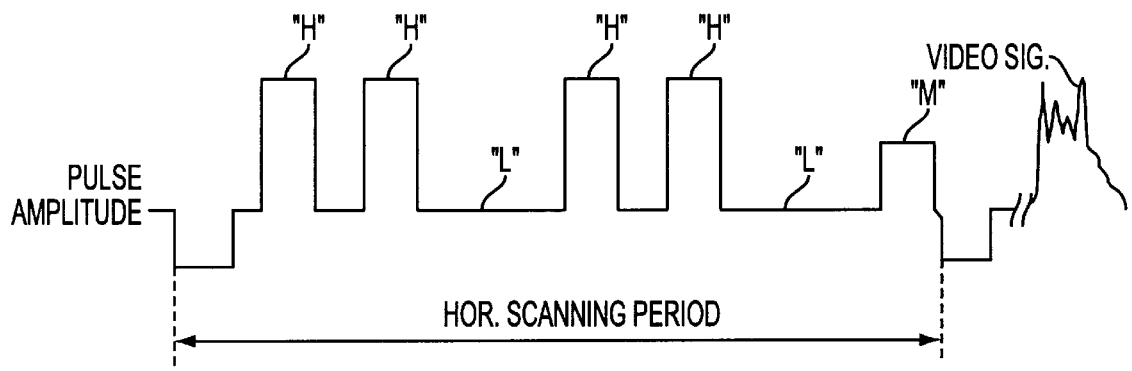
FIG. 10 shows waveforms of an identification code signal.
Figure 10B:
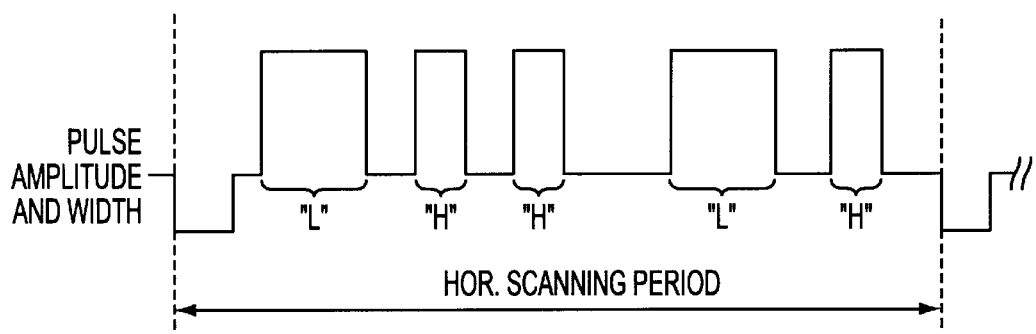

Identification code signals are shown in FIG. 10(A–C). The identification code signal is a binary code or a bar code signal having two or more levels composed of a high level or white, which is the maximum or highest level of the picture signal in the video signals, a low level or black, which is the lowest level of the picture signal, and a median level or gray, which is the medium level of a picture signals in the video signal generated by the television cameras 18 as shown in FIG. 10A; the identification code may be a combination of pulse signal levels and varying pulse widths as shown in FIG. 10B.

Figure 10C:
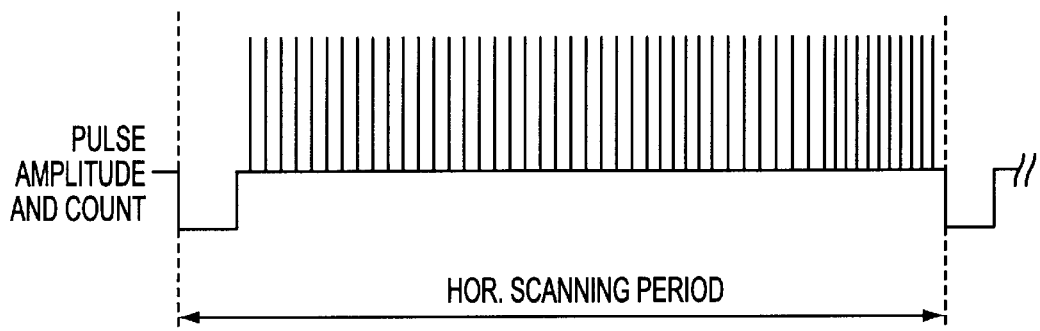

Alternatively, the identification code signal may be either a sine-wave signal or a pulse signal having a frequency corresponding to the identification code, the sine-wave, or the pulse signal is generated during one or more horizontal scanning periods a shown in FIG. 10C, preferably, during the vertical blanking period.

The control signal fed by control circuit 100 shown in FIG. 6 generates control code signals as electronic shaped signals similar to the identification code signal shown in FIG. 10(A–C). However, different shaped electrical signals may be applied to the control code signal and the identification code signal. Similarly, if the identification code is incorporated in the control signal it does not have to be identical to the identification code generated by the identification code setting circuit 72 of the television camera of FIG. 3. Any code commensurating with the allotted identification to each television camera can be used instead of an identical identification code.

In FIG. 3, each television camera 18 further includes a code extraction circuit 76 for extracting a control code and an identification code transmitted from the control 100 shown in FIG. 6, an identification code comparing circuit 78 for comparing the extracted identification code with an identification code fed from the identification setting circuit 72 for feeding match signal to the decoder 80 when both codes correspond or commensurate to each other, and a decoder 80 for decoding the control code fed from the code extraction circuit 76 and generating control commands corresponding to the decoded control code only when the decoder 80 is fed with match signal from the identification code comparator 78.

Figure 8:
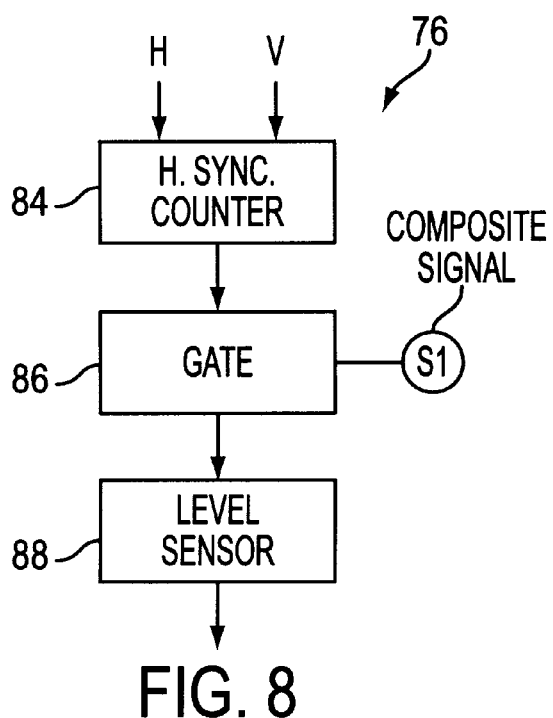
FIG. 8 is a block diagram of a code extraction circuit of the television camera shown in FIG. 3.

The code extraction circuit 76 shown in FIG. 8 includes a counter 84 for counting the number of horizontal synchronizing pulses during every field or frame of the video signal, a gate circuit 86 connected to the output of the counter 84 for outputting the video signal fed from video transmission line S1 when the counted value of the counter 84 is a predetermined value, a level sensor 80 for sensing a signal level or for detecting the envelop of the signal fed from a gate circuit 88 to reproduce and output the code signal extracted from the video signal fed from video transmission line S1.

The ID code comparing circuit 78 generates a match signal when the extracted code fed from the extraction circuit 76 corresponds to or commensurates with the code set in the setting circuit 72, and generates a mismatch signal when the extracted code fed form the extraction circuit 76 does not correspond to or commensurate with the code set in the setting circuit 72 thereby blocking the control command. When the control command is not combined with the identification code the code comparing circuit is not needed and the code extracted by the extraction circuit 76 can be fed directly to the decoder 80.

When using a control code and an identification code having the signal waveform shown in FIG. 10C the level sensor circuit 88 may incorporate a frequency counter or pulse counter for counting the frequency or the number of pulses fed from the gate circuit 86.

The decoder 80 of FIG. 3 feeds the different control commands to the motor driver 6 for operating the motors or other peripherals of the television camera 18 by issuing commands such as wiper on-off, tilting up-down, panning left-right, zooming tele-wide, focus near-far, iris open-close or the like, or commanding the start or the stop of the transmission of a video signal. The motor driver 6 is fed from the battery control 8 with power source form the charge battery 10 through the output terminal 7 shown in FIG. 4. The motor driver 6 feeds also current consuming peripherals such as a heater H6 and a fan F6 that may be automatically switched on by switches 6' using thermostats or feeds other peripherals such as illuminator L6 that are automatically operated by light sensors or timers.

The television camera may be equipped with a preprogrammed internal CPU C6 using a microprocessor or logic circuits for automatically activating any of the current consuming peripheral or other functions of the television cameras on the basis of programmed functions.

It has been apparent from the above description that a constant current is fed to a television camera, through a common transmission line used for propagating information signals, for supplying power to the camera circuits and to an associated battery and thereby enabling random operation of motors and other current consuming peripheral of the television camera without disturbing the information signals by random current drain. It is also apparent that the television camera itself can be operated by the associated battery when the constant current supply is cut off.

It has also been apparent from the above description that a multiplex signal composed of the video signal consisting of the composite video signal, along with audio signal and the identification code respectively allotted to each television camera is transmitted from each television camera 18 to the receiving site 14 through the camera transmission line 16 and information transmission line 12.

Referring back to FIG. 6, each receiving site 14 includes an interface 90 for receiving an information signal transmitted through the information transmission line 12 selected by the selection circuit 30. The interface 90 feeds the received information signal to the monitor 92 and the video cassette recorder 94.

The monitor 92 is a television receiver for displaying an image corresponding to the video signal included in the information signal transmitted from the television cameras 18 and for reproducing sound in accordance with the corresponding audio signal included in the information signal. The video cassette recorder 94 is a video cassette recorder for recording and playing back the video signal and the audio signal transmitted from the television cameras 18.

The receiving site 14 further includes a memory 96 for storing data for identifying the television camera connected to the monitor 92, an identification code extraction circuit 98 for extracting an identification code from the information signal, a control circuit 100 for identifying the television camera connected to the monitor 92 by reading out data from the memory 96 on the basis of the code extracted from the information signal and for feeding the identifying data to the interface 90 for superimposing an identification text, numeric or graphic, for display on the screen of the monitor 92 along with the picture generated by the video signal. Similarly, the text, numeric or graphic display can be recorded by the video cassette recorder 94 along with the video signal generated by the television camera 18.

The identifying data may be a graphic illustration data for displaying an installation location, an identification number data, a text description data related to the television camera of its location or the like.

Figure 9:
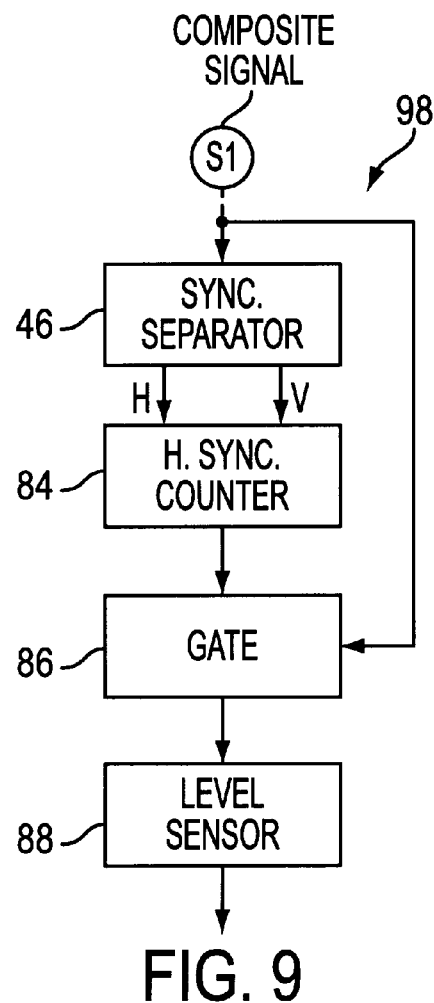
FIG. 9 is a block diagram of a code extraction circuit of the receiving site shown in FIG. 6.

The code extraction circuit 98 shown in FIG. 9 is composed of a synchronizing signal separator 46 for separating the horizontal and vertical synchronizing signals from the composite video signal fed from the selector 30, a counter 84 for counting the number of horizontal scanning lines of the composite video signal for each field or frame, a gate circuit 86 for outputting the composite signal transmitted from the television camera only during a period of time when a counted value of the counter 84 is equal to a predetermined value, and a level sensor 88 for reproducing a code signal by sensing the level or the envelope of the output signal of the gate circuit 86.

The extracted identification code fed from the extraction circuit 98 is applied by the control circuit 100 for reading out the stored data from the memory 96. The data fed from the memory 96 via the controller 100 is superimposed onto the video signal in the interface circuit 90 for displaying a numeric, text or graphics onto the monitor screen 92, enabling an operator to recognize the location or position being observed or monitored by the television camera 18. The control circuit 100 also controls the superimposed display position and switching the display on and off. Such an apparatus for superimposing numeric text or graphics is disclosed in U.S. Pat. No. 4,943,864 the contents of which are incorporated herein by reference.

The control circuit 100 transmits and receives information between the control circuit 100 and the selector 30. A signal fed from the selector 30 to the control circuit 100 also contains switching on or switching-over information for selecting an information transmission line 12. H and V synchronizing signals are fed to the control circuit 100 by the synchronizing separator 46 for timing the control commands, while for the timing of the switching of the information transmission line the control circuit 100 is fed with P1 pulse by the external synchronizing generator 31. However, it is also possible to synchronize the switching time to the separated H and V synchronizing signals.

The control circuit 100 feeds a select command to the selector 30 for selecting the information transmission line in synchronized timing with the external synchronizing signal. Therefore, the selector circuit 30 switches on any of the information transmission lines 12 or switches over from one information transmission line 12 to another in accordance with the select command and in synchronization with the external synchronization signal.

As a result, the mixed video and the audio signals generated by the television camera selected through the selector 30 are fed to monitor 92 for reproducing a picture display and a sound, along with recording of the vide and audio signals onto the video cassette recorder 94. Therefore, the operator can select for monitoring and recording any of the television cameras 18 through the control circuit 100 of the receiving site 14. The operator can further superimpose any numeric, text or graphics for the displayed signal into the displayed picture reproduced from the video signal.

Further, when the superimposed numeric, text or graphics obstruct the observed picture, the operator can reposition the superimposed display or switch off the superimposed display from the monitor screen.

According to the apparatus for powering television camera via camera transmission lines shown in FIGS. 1 and 2, the television cameras can be powered through their respective transmission lines and connect to a receiving site by a simple apparatus in an arbitrary combination with each other, whereby, one, two or any arbitrary television cameras can be connected to a plurality of arbitrary receiving sites and monitors through the transmission lines connecting the receiving sites and the current supply means.

Further, since the timing command of the switching on or the switch-over of the information transmission line in the selection circuit 30 is synchronized by the external synchronizing signal fed to the controller 100, the selection circuit 30 switches over the information transmission synchronously with the video signal. As a result, the reproduced picture images during and immediately after the switching on or the switching over from one information transmission line to another are not disturbed.

The sound signal injection circuit 71 shown in FIG. 3 of the television camera 18 can be a circuit for modulating a carrier wave by an audio signal, and for outputting a composite video signal mixed with the modulated audio signal. In this case, the receiving site 14 shown in FIG. 6 includes a audio demodulating circuit 91 for feeding the audio signal to the monitor 92 and the video cassette recorder 94. Similarly the audio demodulator circuit 91 can be included in the current supply unit 26. Shown in FIG. 5 is the current supply unit 26 incorporating the audio demodulator circuit 40 fed from the camera transmission line 16 with the information signal including the mixed modulated audio signal. The audio demodulator circuit may employ a well known audio demodulator IC or other standard components to output the audio signal through the audio output terminal 41.

Further, the audio injection circuit 71 can be provided with a circuit for compressing a time base of an audio signal at such a rate that a time corresponding to one vertical scanning period of a video signal becomes equal to a time corresponding to one or more horizontal scanning periods of the video signal, and for injecting the compressed audio signal during the vertical blanking period of the video signal. In this case, the audio decoder 91 of the receiving site 14 shown in FIG. 6 includes a circuit for extracting the compressed audio signal from the video signal and for decompressing the time base of the extracted audio signal. Similarly, the audio decoding circuit 40 of the current supply unit 26 shown in FIG. 5 also incorporates a circuit for extracting the compressed audio signal from the video signal and for decompressing the time base of the extracted audio signal.

The control signal for controlling the television camera 18 can be fed from a single control circuit to any arbitrary number of television cameras. Otherwise, a control circuit may be respectively provided for each television camera 18 to feed the control signal from each control circuit individually to each of the information transmission lines 12. In addition, the control signal may be transmitted from each receiving site to each current supply unit 26 for injecting the control signal to the camera transmission lines 16.

As shown in FIG. 5, the current supply unit 26 includes the information signal separator/injector circuit 21 for separating the information signals from the DC fed to the camera transmission line 16. The signal separation or injection of the signal separator/injector circuit 21 is achieved by means of coupling capacitors or signal transformers which couple the different components of the information signal two way and by blocking the DC components. Accordingly, a control signal fed from the receiving site 14 can be fed into the control signal input terminal 22 and injected into the camera transmission line 16 through the signal separator/injector circuit 21.

Further, instead of having a single control circuit for each receiving site, two or any arbitrary number of control circuits 100 can be included in a receiving site. Otherwise, a single control circuit may be provided for multiple receiving sites to control all the receiving sites by a single controller.

It should be understood, of course, that the foregoing disclosure relates to only a preferred embodiment of the invention and that it is intended to cover all changes and modifications of the example of the invention herein chosen for the purposes of the disclosure, which modifications do not constitute departures from the spirit and scope of the invention.

What is claimed is:

1. An apparatus for powering a television camera via an information signal transmission line, comprising:

said television camera adapted to operate by a constant DC current fed through a transmission line terminal for connecting said transmission line to said television camera and process and output multiplexed electrical information signals including composite video signals or digital video signals;

a constant current supply means for feeding said television camera with said constant DC current and receiving said output multiplexed electrical information signals from said television camera; and a rechargeable battery connected to said television camera for powering said television camera when said constant DC current is cut off, said rechargeable battery being charged by said constant DC current fed through said transmission line terminal;

said transmission line connecting said television camera with said constant current supply means for feeding said television camera with said constant DC current and for feeding said constant current supply means with said multiplexed electrical information signals;

said constant current supply means supplying said constant DC current which is equal to the sum of a constant current needed for operating said television camera and a constant current needed to charge said rechargeable battery and wherein the charged battery provides power needed to operate said television camera when said constant DC current is cut off or switched off.

2. An apparatus for powering a television camera via an information signal transmission line, comprising:

a television camera adapted to operate by a constant DC current fed through a transmission line terminal for connecting said transmission line to said television camera and process and output multiplexed electrical information signals including composite video signals or digital video signals;

at least one current-consuming peripheral device connected to said television camera;

a rechargeable battery connected to said television camera for powering said at least one current-consuming peripheral device; and a constant current supply means for feeding said television camera with said constant DC current and output said multiplexed electrical information signals;

said transmission line connecting said television camera with said constant current supply means for feeding said television camera with said constant DC current and for feeding said constant current supply means with said multiplexed electrical information signals;

said rechargeable battery being charged by said constant DC current fed through said transmission line terminal;

said constant current supply means supplying said constant DC current which is equal to the sum of a constant current needed for operating said television camera and a constant current needed to charge said rechargeable battery and wherein the charged battery provides power needed to operate said at least one current consuming peripheral.

3. The apparatus according to claim 2, wherein said at least one current-consuming peripheral device is automatically operated by means of sensors or timers.

4. The apparatus according to claim 2, wherein said at least one current-consuming peripheral device is self-operated by means of one of a microprocessor and a programmed circuit.

5. The apparatus according to claim 2, wherein said television camera is automatically powered by said rechargeable battery when said constant DC current is cut off or switched off.

6. The apparatus according to claim 2, and further comprising:

control means for generating control signals for operating said at least one current-consuming peripheral device and for feeding the control signals to said constant current supply means, and wherein said constant current supply means transfer said control signals to said television camera through said transmission line.

7. The apparatus according to claim 6, further comprising:

an identification code signal generation circuit included in said television camera for generating an identification code signal corresponding to an identification code respectively allotted to said television camera and for injecting said identification code signal into said multiplexed electrical information signals fed to said transmission line; and receiving means for receiving and displaying or recording video signals contained in said multiplexed electrical information signals;

said receiving means including an identification code signal processing means for extracting said identification code signal from said video signal fed through said transmission line and through said current supply means to said identification code signal processing means for feeding a signal corresponding to the extracted identification code signal to said control means and to said receiving means.

8. The apparatus according to claim 7, wherein said control means generates a control signal including a coded control command together with an annexed identification code signal fed by said identification code signal processing means for operating said at least one current-consuming peripheral device, wherein said control signal applied to said television camera operates said at least one current-consuming peripheral device by said coded control command only when the identification code signal annexed to said coded control command corresponds to the identification code signal allotted to said television camera.

9. The apparatus according to claim 7, wherein said receiving means includes a memory for storing identification data for each allotted identification code, a controller for retrieving said identification data pertaining to said extracted identification code signal from said memory for superimposing said identification data onto said video signal.

10. An apparatus for powering a plurality of television cameras via information signal transmission lines, comprising:

said plurality of television cameras each adapted to operate by a constant DC current fed through transmission line terminals each for respectively connecting one of said transmission lines to a respective one of said plurality of television cameras and process and output multiplexed electrical information signals including composite video signals or digital video signals;

at least one current-consuming peripheral device connected to each of said television cameras;

a rechargeable battery connected to each of said television cameras for powering said at least one current-consuming peripheral device, said rechargeable battery being charged by said constant DC current fed through a respective one of said transmission line terminals;

a plurality of constant current supply means, each corresponding to a respective television camera for feeding each respective television camera with said constant DC current and receiving said output multiplexed electrical information signals from each of said television cameras;

said plurality of transmission lines connecting said plurality of television cameras with said plurality of constant current supply means for feeding said plurality of television cameras with said constant DC current and for feeding said plurality of constant current supply means with said multiplexed electrical information signals;

a selector means for selecting said multiplexed electrical information signals fed by the said plurality of constant current supply means; and receiving means for receiving and displaying or recording video signals contained in said selected multiplexed electrical information signals;

said constant current supply means supplying said constant DC current which is equal to the sum of a constant current needed for operating each of said television cameras and a constant current needed to charge said rechargeable battery, and wherein the charged battery provides power needed to operate said at least one current-consuming peripheral device connected to each of said plurality of television cameras.

11. The apparatus according to claim 10 wherein said at least one current-consuming peripheral device is automatically operated by means of sensors or timers.

12. The apparatus according to claim 10 wherein said at least one current-consuming peripheral device is automatically operated by means of a microprocessor or a programmed circuit.

13. The apparatus according to claim 10, wherein each of said plurality of television cameras is automatically powered by said rechargeable battery when said constant DC current is cut off or switched off.

14. The apparatus according to claim 10, and further comprising:

control means for generating control signals for operating said at least one current-consuming peripheral device and for feeding the control signals to each of said constant current supply means and wherein said each constant current supply means is adapted to transfer the control signals to each of the television cameras through said transmission line.

15. The apparatus according to claim 14, and further comprising:

an identification code signal generation circuit included in each said television cameras for generating an identification code signal corresponding to an identification code respectively allotted to a respective television camera and for injecting said identification code signal into said multiplexed electrical information signals fed to said each transmission line; and receiving means coupled to said selector means for receiving and displaying or recording video signals contained in said multiplexed electrical information signals, said receiving means including an identification code signal processing means for extracting said identification code signal from said video signal fed through said selector means to said identification code signal processing means for feeding a signal corresponding to the extracted identification code signal to said control means and to said receiving means.

16. The apparatus according to claim 15, wherein said control means generates a control signal including a coded control command together with annexed identification code signal fed by said identification code signal processing means for operating said at least one current-consuming peripheral device, wherein said control signal applied to said television camera operates said at least current-consuming peripheral device by said coded control command only when the identification code signal annexed to said coded control command corresponds to the identification code signal allotted to said television camera.

17. The apparatus according to claim 15, wherein said receiving means includes a memory for storing identification data for each allotted identification code, and a controller for retrieving said identification data pertaining to said extracted identification code signal from said memory for superimposing said identification data onto said video signal.

18. The apparatus according to claim 10, and further comprising:

an external synchronizing signal generating means for generating and feeding an external synchronizing signal to said plurality of television cameras through said plurality of transmission lines for synchronizing said plurality of said television cameras, each said television camera including an internal synchronizing signal generation circuit synchronized by said external synchronizing signal, wherein said external synchronizing signal is a pulse signal having a voltage level higher than the maximum voltage level or lower than the minimum voltage level of said video signal, said receiving means further including a circuit for injecting said external synchronizing signal into transmission lines extending from said constant current supply means to said selector means for transferring said external synchronizing signal to said television cameras through said current supply means and said transmission lines, and each of said television cameras further including a level comparing circuit for extracting said external synchronizing signal by comparing a signal level of said pulse signal with a reference signal having a predetermined voltage level for applying said extracted external synchronizing signal to said internal synchronizing signal generation circuit.

19. The apparatus according to claim 18, wherein said selector means includes a selection circuit for selectively switching on one or more of said plurality of transmission lines or switching over from one of said plurality of transmission lines to another, wherein a switching on time or a switching over time is synchronized with said external synchronizing signal.

20. The apparatus according to claim 18, and further comprising:

an external synchronization input terminal included in each of said current supply means for injecting said external synchronizing signal to said plurality of transmission lines.

21. The apparatus according to claim 18, and further comprising:

a pulse shaping circuit for generating a clipping pulse which coincides with said external synchronizing pulse signals; and a synchronizing pulse signal clipping circuit for clipping said synchronizing pulse signals from said multiplexed electrical information signals fed from said selector means to said receiving means on the basis of said clipping pulse.

22. The apparatus according to claim 20, and further comprising:

a plurality of pulse shaping circuits each for generating a clipping pulse which coincides with said external synchronizing pulse signals; and a plurality of synchronizing pulse signal clipping circuits each adjoining a respective constant current supply means for clipping said synchronizing pulse signals from said output multiplexed electrical information signals fed to said current supply means on the basis of said clipping pulse.

23. The apparatus according to claim 1, wherein said television camera further includes a signal mixing means for generating a mixed signal composed of a video signal and an audio signal by injecting the audio signal into said video signal and for feeding said mixed signal to said transmission line.

24. The apparatus according to claim 2, wherein said television camera further includes a signal mixing means for generating a mixed signal composed of a video signal and an audio signal by injecting the audio signal into said video signal and for feeding said mixed signal to said transmission line.

25. The apparatus according to claim 10, wherein said television cameras further include a signal mixing means for generating a mixed signal composed of a video signal and a audio signal by injecting the audio signal into said video signal and for feeding said mixed signal to said transmission lines.

26. The apparatus according to claim 23, wherein said constant current supply means further includes an audio signal retrieving means for outputting the audio signal by retrieving said audio signal from said mixed signal.

27. The apparatus according to claim 23, wherein said apparatus further comprises a receiving means for receiving and displaying or recording video signals contained in said multiplexed electrical information signals and wherein said receiving means further includes an audio signal retrieving means for outputting the audio signal by retrieving said audio signal from said mixed signal.

28. The apparatus according to claim 24, wherein said constant current supply means further includes an audio signal retrieving means for outputting the audio signal by retrieving said audio signal from said mixed signal.

29. The apparatus according to claim 24, wherein said apparatus further comprises a receiving means for receiving and displaying or recording video signals contained in said multiplexed electrical information signals and wherein said receiving means further includes an audio signal retrieving means for outputting the audio signal by retrieving said audio signal from said mixed signal.

30. The apparatus according to claim 25, wherein said constant current supply means further includes an audio signal retrieving means for outputting the audio signal by retrieving said audio signal from said mixed signal.

31. The apparatus according to claim 25, wherein said receiving means further includes an audio signal retrieving means for outputting the audio signal by retrieving said audio signal from said mixed signal.

32. The apparatus according to claim 1, wherein said constant current supply means includes constant current regulating means and current adjusting means, coupled to said transmission line to supply said constant DC current to be fed through said transmission line terminal.

33. The apparatus according to claim 2, wherein said constant current supply means includes constant current regulating means and current adjusting means, coupled to said transmission line to supply said constant DC current to be fed through said transmission line terminal.

34. The apparatus according to claim 10, wherein each of said constant current supply means includes constant current regulating means and current adjusting means, coupled to a respective one of said transmission lines to supply said constant DC current to be fed through a respective one of said transmission line terminals.

35. The apparatus according to claim 2, wherein said constant DC current does not include a current consumed by said peripheral device.

36. The apparatus according to claim 2, wherein said television camera is automatically powered by said rechargeable battery and said at least one current-consuming peripheral is prevented from operating when said constant DC current is cut off or switched off.

* * * * *